United States Patent [19]

Hanna et al.

[11] Patent Number: 4,964,544
[45] Date of Patent: Oct. 23, 1990

[54] PUSH UP DISPENSER WITH CAPSULE VALVE

[75] Inventors: Emmanuel A. Hanna, Lakeview Terrace; Henry J. Loewenthal, Santa Monica, both of Calif.

[73] Assignee: Bobrick Washroom Equipment, Inc., North Hollywood, Calif.

[21] Appl. No.: 232,679

[22] Filed: Aug. 16, 1988

[51] Int. Cl.$^5$ .......................... B67D 5/06; B67D 5/40
[52] U.S. Cl. .................... 222/181; 137/859; 222/321; 222/341; 222/385
[58] Field of Search ................ 137/859; 222/181, 185, 222/207, 212, 213, 321, 340, 341, 377–381, 383, 385, 481, 490–497

[56] References Cited

U.S. PATENT DOCUMENTS

| 2,093,942 | 9/1937 | Stuff | 222/181 |
| 2,269,847 | 1/1942 | Feinson | 222/181 UX |
| 2,604,297 | 7/1952 | Winstead | 137/859 X |
| 2,640,481 | 6/1953 | Conley | 137/859 X |
| 2,772,817 | 12/1956 | Jauch | 222/207 |
| 3,321,111 | 5/1967 | Jellinek | 222/341 X |
| 3,871,558 | 3/1975 | Gournelle | 222/181 |
| 4,227,650 | 10/1980 | McKinney | 222/494 X |

FOREIGN PATENT DOCUMENTS

| 1109436 | 9/1981 | Canada | 222/383 |
| 2395732 | 3/1979 | France | 222/341 |
| 2567387 | 1/1986 | France | 222/383 |
| 751289 | 6/1956 | United Kingdom | 137/859 |
| 808722 | 2/1959 | United Kingdom . | |
| 1019717 | 2/1966 | United Kingdom . | |
| 1186314 | 4/1970 | United Kingdom . | |

*Primary Examiner*—Kevin P. Shaver
*Attorney, Agent, or Firm*—Harris, Kern, Wallen & Tinsley

[57] ABSTRACT

A push up fluid dispenser having a fluid storage container and a vertically oriented plunger carried in the container, with the plunger being manually pushable upward for dispensing fluid from the container. The container includes a valve cylinder mounted in the container and having an upper opening and an interior passage for slidingly receiving the plunger, and the plunger having a fluid flow passage therein providing a flow path from the cylinder interior to the exterior of the dispenser. A first one-way valve is disposed for control of fluid flow into the cylinder interior through an upper opening and a second one-way valve is disposed for control of fluid flow from the cylinder interior into the plunger passage, with a spring between the cylinder and plunger urging the plunger downward.

12 Claims, 2 Drawing Sheets

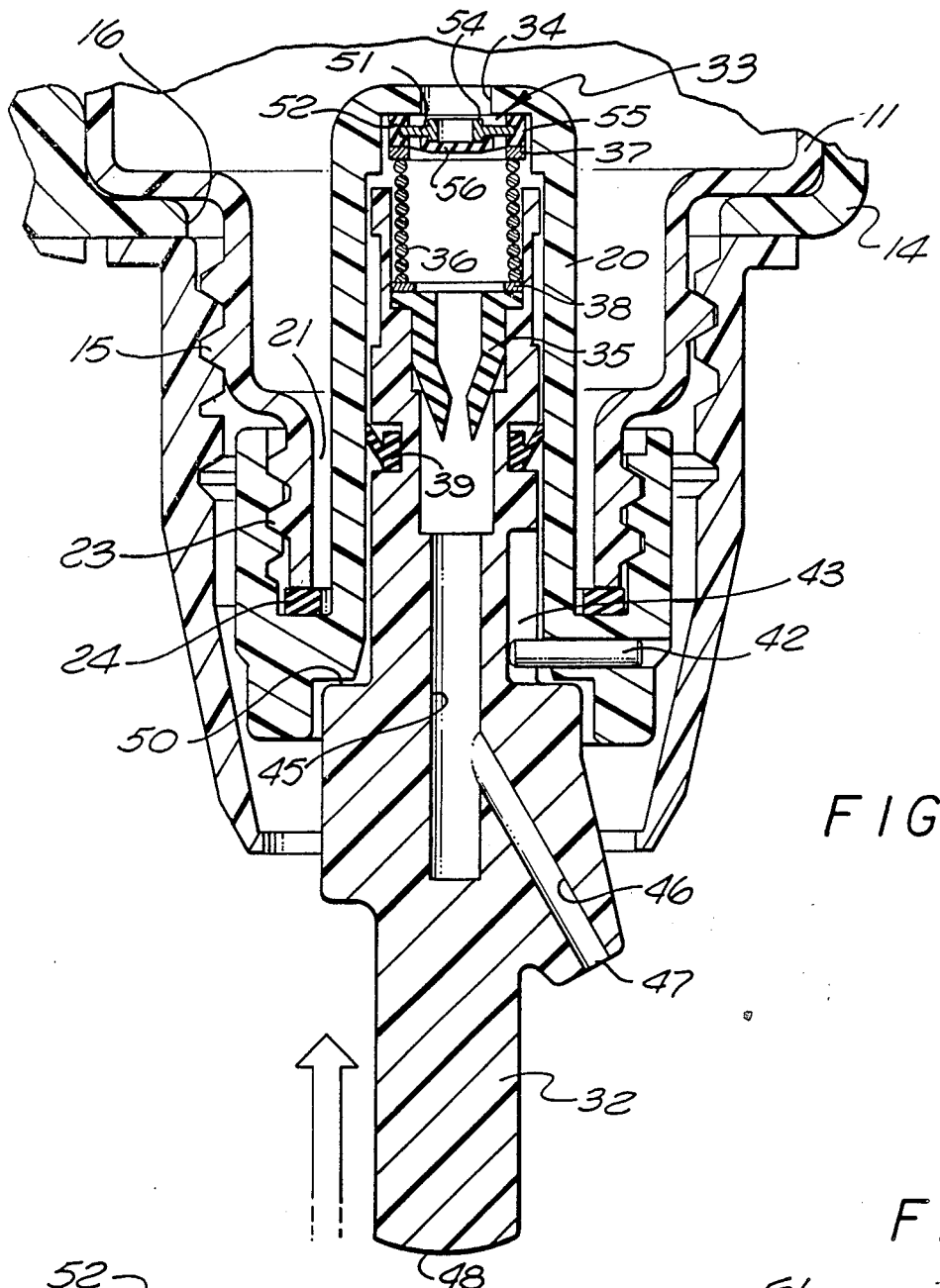
FIG. 2
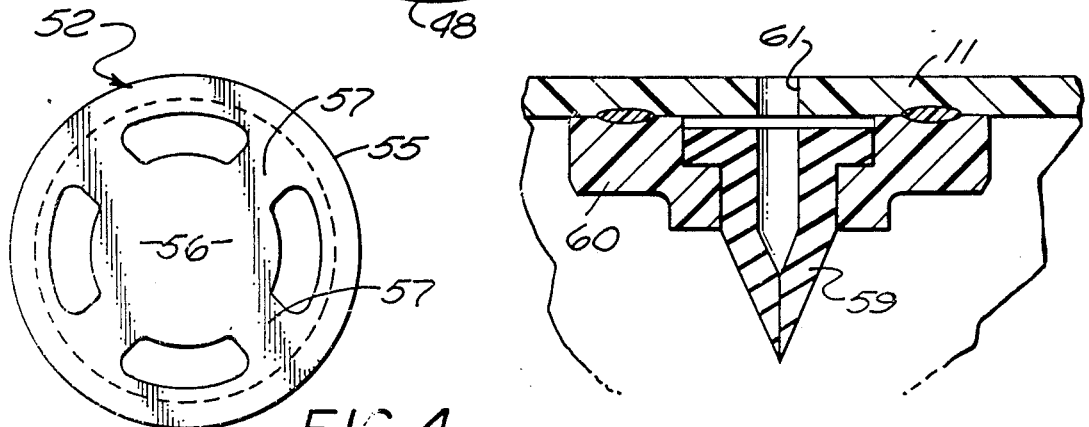
FIG. 3
FIG. 4

PUSH UP DISPENSER WITH CAPSULE VALVE

BACKGROUND OF THE INVENTION

This invention relates to fluid dispensers, and in particular to a new and improved push-up type dispenser.

Push-up dispensers are widely used for dispensing a variety of materials, both powders and liquids, typically lotions and soaps. Push-up type dispensers are very desirable, permitting operation by engaging a plunger with the palm of the hand and retention of the dispensed material in the same hand.

The push-up dispensers presently known are gravity or free flow devices, with upward motion of a plunger opening a flow path from the interior of the material container, downward around the plunger to the exterior of the dispenser. Dispensers of this type have problems with leaking or dripping of material and with irregular flow of material. One solution for reducing leaking is to use a spring providing a stronger closing force, however this is an undesirable solution as it also increases the force required for actuating the dispenser.

Accordingly it is an object of the present invention to provide a new and improved push-up fluid dispenser which overcomes the leaking and dripping problem. A further object is to provide such a fluid dispenser which incorporates a positive displacement pump that can dispense a metered amount of fluid. A particular object is to provide such a dispenser incorporating a head holding capsule or one-way valve at or near the top of the dispenser valve chamber for achieving the non-drip operation.

It is another object of the invention to provide a push-up fluid dispenser which has a relatively low operating force while at the same time having a relatively high compression ratio. An additional object is to provide such a dispenser which can generate a suction for drawing liquid into the valve chamber during the return stroke.

It is another object of the invention to provide a push-up fluid dispenser with a manually operated plunger which plunger has an outlet fluid flow path therethrough with an outlet opening positioned above the lower end of the plunger, so that the dispenser fluid outlet remains a constant distance above the operators hand during the upward or dispensing stroke. A further object is to utilize this construction with a positive displacement pump so that the fluid is ejected through the outlet opening into the operators hand away from the plunger end.

These and other objects, advantages, features and results will more fully appear in the course of the following description

SUMMARY OF THE INVENTION

A push-up fluid dispenser having a fluid storage container and a vertically oriented valve mounted in the container, with the valve plunger being manually pushable upward for displacing fluid from the container. The dispenser includes a valve cylinder mounted in the container with the plunger slidably mounted within the cylinder and with the plunger having a fluid flow passage therein providing a flow path from the interior of the cylinder to the exterior of the dispenser. Two one-way valves are provided with one controlling fluid flow into the chamber through an upper opening of the chamber and with the other providing for fluid flow from the chamber into the plunger passage. In the preferred embodiment, a compression spring holds the two one-way valves in position and urges the plunger downward for the return or vacuum stroke. The plunger is moved upward against the spring in the compression or dispensing stroke, ejecting a predetermined amount of fluid from the valve cylinder.

A self-contained head holding capsule valve for use as a one way valve for controlling the flow into the dispenser container.

BRIEF DESCRIPTION OF THE DRAWINGS

FIG. 2 is an enlarged partial sectional view of the dispenser of FIG. 1 with the plunger in the up position;

FIG. 3 is an enlarged partial sectional view of an alternative embodiment for the top breather valve of the container of FIG. 1; and FIG. 4 is an enlarged bottom view of the seal of the capsule valve of FIGS. 1 and 2.

DESCRIPTION OF THE PREFERRED EMBODIMENTS

Figure 1:
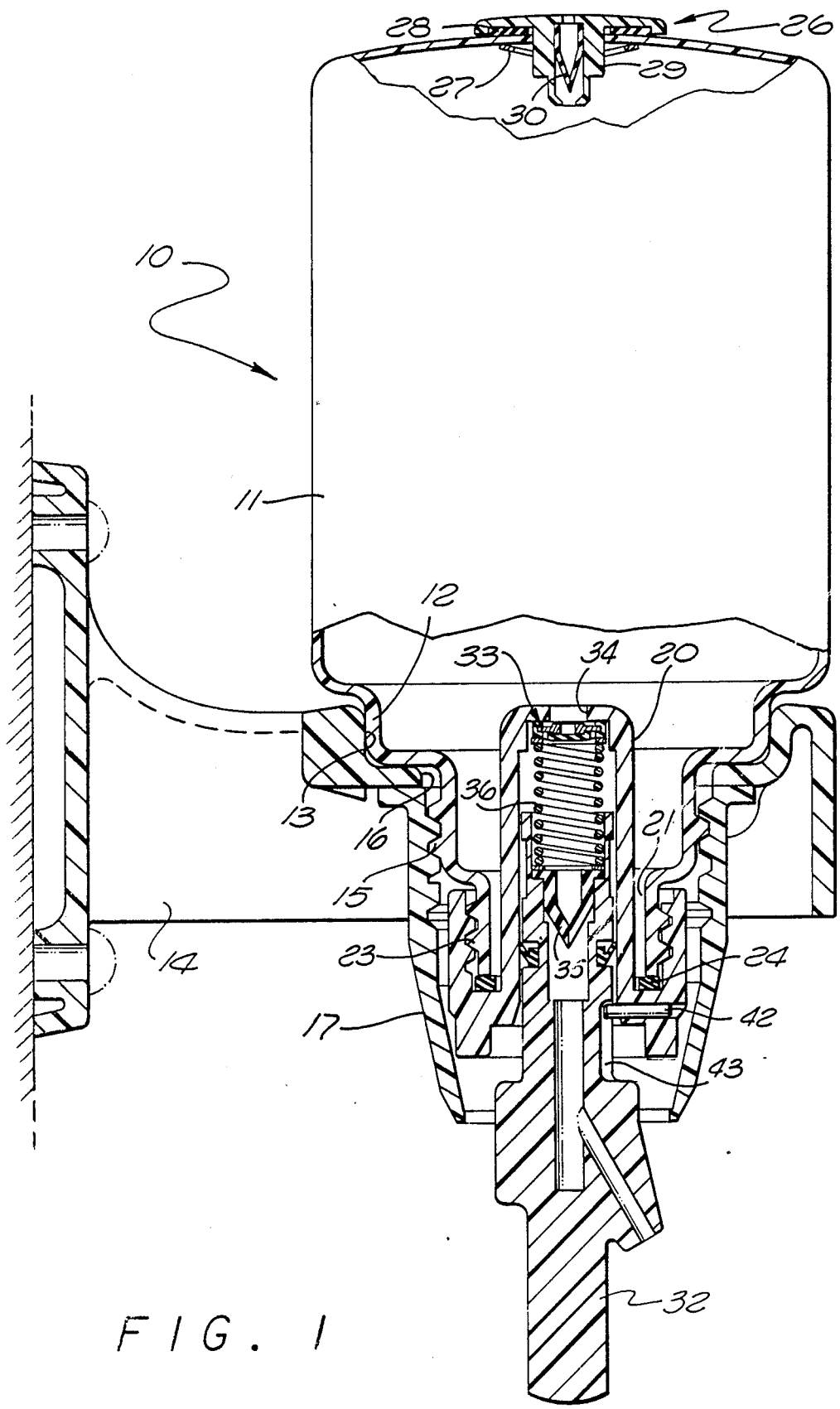
FIG. 1 is a side view, partly in section, of a dispenser incorporating the presently preferred embodiment of the invention with the dispenser plunger shown in the rest or down position.

In the drawing figures, a dispenser 10 includes a container 11 having a shoulder 12 resting in a cup-shaped section 13 of a wall mounting bracket 14. The container has a neck with a first threaded section 15 positioned in an opening 16 of the mounting bracket, and is held in place on the mounting bracket by a mounting sleeve 17 having internal threads which mate with the threaded section 15 of the container. This arrangement for mounting the container in the mounting bracket is conventional.

The valve includes a valve cylinder 20 formed with an annular groove 21 having internal threads which mate with another threaded section 23 of the container neck for mounting the valve cylinder at the open end of the container, with a seal gasket 24 at the open end of the container An air inlet opening is provided at the upper end of the container and in the embodiment of FIG. 1, a one-way check valve 26 is mounted in the opening by a spring washer 27 and seal gasket 28 The check valve 26 comprises a molded body 29 with a flexible duckbill valve 30 positioned therein. The sides of the duckbill are normally closed as shown in FIG. 1, and are opened when the exterior pressure exceeds the interior pressure of the container, permitting flow into the container. Conversely, when pouring in liquid, the pressure within the container exceeds the pressure outside the container, and the sides of the duckbill are compressed together, providing the desired sealing. This configuration prevents leakage from the container when it is inverted for filling, while permitting flow of air into the container to equalize the internal and external pressures during dispensing. Other types of one way valves may be used, such as a ball and spring check valve, if desired.

A plunger 32 is mounted within the valve cylinder 20, with a one-way valve 33 adjacent an upper opening 34 in the valve cylinder, and another one-way valve 35 carried at the upper end of the plunger 32. A spring 36 is positioned between the valves 33, 35 with a washer 37 at the upper end of the spring and another washer 38 at the lower end of the spring. An annular seal 39 is carried in an annular groove in the plunger The plunger with the valves, spring and seal are held in place by a pin 42 in the valve chamber, with the inner end of the pin riding in a slot 43 of the plunger.

The plunger has an internal fluid flow path including an axial section 45 and an oblique section 46, with the outlet end 47 of the oblique section positioned above the lower end 48 of the plunger.

The preferred embodiment of the one-way valve 33 is a self-contained head holding valve, as best seen in FIGS. 2 and 4. A washer 51 is enclosed in a resilient seal 52. The washer 51 has a central opening with an annular shoulder 54. The seal is molded of a flexible resilient material with an annular rim 55 having a groove for receiving the washer, and a central flapper 56 joined to the rim by a plurality of spokes 57. This design is sometimes known as a capsule valve. In assembling the valve, the rim 55 of the seal is stretched over the edge of the washer, bringing the flapper 56 into engagement with the annular shoulder 54. In this arrangement the valve is normally closed, with the flapper blocking flow through the opening in the washer. A pressure differential across the valve with a higher pressure above moves the flapper away from the washer, permitting flow through the valve. The stretched condition of the seal when installed on the washer urges the flapper against the shoulder so that the valve is pre-loaded in the closed position. The pressure differential required to open the valve and permit flow therethrough preferably is two to four times the pressure of the head of the liquid in the container.

The lower one-way valve 35 typically is a duckbill valve of the same design used in the valve 26 shown in FIG. 1 at the top of the container.

An alternative construction for the valve 26 is shown in FIG. 3, with a duckbill valve 59 held in the container 11 by a bracket 60 which is attached to the container in a leak proof manner, such as by an adhesive or cold welding or otherwise as desired. Preferably, the valve 59 is an interference fit in the bracket 60. The interior of the duckbill valve 59 is aligned with an opening 61 in the container, and operates in the same manner as the valve 26 of FIG. 1. The opening 61 may be in the top of the container or in a side of the container near the top.

In operation, the container 11 is removed from the support bracket 14 by unscrewing the sleeve 17. The container is then inverted and the cylinder 20 is removed by unscrewing. The container is filled with the fluid to be dispensed, typically a soap or lotion, the cylinder 20 is screwed in place, the container is turned over to its normal position, inserted into the bracket 14 and fastened in place by the sleeve. The check valve 26 at the upper end of the container prevents leaking during the filling operation. The dispenser is now in the position of FIG. 1.

Fluid is dispensed by pushing upward on the plunger 32. The dispenser operates as a positive displacement pump and the chamber within the valve cylinder between the valves 33, 35 ordinarily initially is empty, requiring one or more priming strokes. Once the chamber is filled with the fluid, normal operation is achieved.

An upward motion of the plunger from the position of FIG. 1 to the position of FIG. 2 compresses the fluid in the chamber, forcing the valve 35 to open as shown in FIG. 2, and expels the fluid from the chamber through the flow path of the plunger and out through the outlet opening 47. Normally, the plunger is pushed upward by placing the palm of the hand at the plunger lower end 48, and the fluid is ejected into the operators palm. As illustrated in FIG. 2, upward motion of the plunger is limited by full compression of the spring. Alternatively upward motion can be limited by engagement of the plunger with the valve chamber at 50. Having the flow path through the plunger with the oblique exit, keeps the fluid away from the lower end of the plunger, while at the same time the dispenser is easily operated with one hand.

Next, the operator releases the plunger, typically by lowering the hand, and the spring 36 moves the plunger down from the position of FIG. 2 to the position of FIG. 1. When the downward motion starts, the valve 35 closes and a vacuum is created in the chamber between the valves 33, 35. The resulting positive pressure above the valve 33 moves fluid from the container downward through the valve 33, with the flapper 56 being moved away from the shoulder 54, and the chamber is filled with a predetermined amount of fluid as the dispenser returns to the position of FIG. 1, ready for another dispensing operation.

With the plunger outlet in the form of a spout above the end of the plunger and at an oblique angle, the liquid flow from the dispenser contacts the user's hand in the order of a half to an inch away from the end of the plunger. This configuration tends to protect the end of the plunger from staining and becoming dirty or caked with dried material. The more viscous liquids tend to stay in the area of contact with the hand and not run towards the lower end of the plunger. The less viscous liquids may contact the lower end of the plunger but run off quickly. The seal 39 prevents leakage around the plunger.

In the preferred plunger configuration illustrated, the oblique passage of the plunger is at about 30 degrees from the vertical, and the lower end of the oblique passage is about one inch above the lower end of the plunger, with the lower end of the passage in the order of one half inch laterally from the center of the plunger. It has been determined that such an arrangement achieves the desired operating characteristics for the usual range of fluid viscosities, while avoiding splashing and dripping.

The design of the valve provides for a relatively high compression ratio which is desirable, since this permits a higher negative pressure within the cylinder and faster priming and cylinder refilling. Also with this construction, the dispenser provides a suction action sufficient to draw in liquid with a head of up to forty inches.

The compression ratio is defined as the volume of liquid inside the chamber at the rest position of FIG. 1 divided by the volume of liquid inside the chamber at the compressed position of FIG. 2. The specific design illustrated in the drawings with a 0.312 inch stroke provides a compression ratio of approximately 2.125.

A dispenser which is capable of holding a head of 40 inches normally is difficult to operate because a large suction is needed to draw fluid into the valve chamber. Hence a relatively high manual force is required for dispensing the fluid. The present dispenser provides both the high head holding capability, thereby reducing leakage, and the low manual operating force by having the high compression ratio.

There are a number of advantages in the disclosed preferred embodiment of the one way valve 33. This is a self-contained unit which can hold a head substantially greater than that normally encountered in the dispenser design. A typical dispenser is not more that about 8 inches tall; in contrast the valve of the invention will hold a head up to about 40 inches, thereby providing a substantial excess of head holding capacity and thus security against leakage.

Also the self contained capsule valve as disclosed can be made considerably smaller than the conventional umbrella valve, while providing better operating characteristics.

The capsule valve design permits large flow passages through the washer and the seal and therefore is much less susceptible to clogging than the conventional umbrella valves and ball and spring valves.

The design of the preferred embodiment will handle both vicous lotions and non-vicous liquids, while requiring an upward force of less that five pounds for operation. Since the dispenser is a positive displacement device and not open to the atmosphere, there is less likelihood of the contents drying out. The valve at the top of the container functions as a breather valve and allows air only to flow in. Preferably, the container itself is molded of a somewhat flexible plastic which will permit expansion with increases of ambient temperature. Also, this breather valve prevents leakage of liquid when the container has been inverted during filling.

We claim:

1. In a push up fluid dispenser having a fluid storage container and a vertically oriented plunger carried in said container, with said plunger being manually pushable upward for dispensing fluid from said container, the improvement comprising in combination:
    a valve cylinder including means for mounting said cylinder in said container, said cylinder having an upper opening and an interior passage for slidingly receiving said plunger,
    said means for mounting including interengaging means for joining said cylinder to said container for support of said cylinder on said container and movement of said cylinder with said container, and seal means for fluid sealing between said cylinder and container,
    with said plunger having a fluid flow passage therein providing a flow path from the interior of said cylinder to the exterior of said dispenser;
    first and second one-way valves, with said first one-way valve being a head holding valve and disposed for control of fluid flow into said interior of said cylinder through said upper opening and with said second one-way valve disposed for control of fluid flow from said interior into said plunger passage;
    spring means engaging said cylinder and plunger urging said plunger downward away from said cylinder upper opening;
    said cylinder and plunger having interengaging stop means for limiting downward movement of said plunger.
    with an upward force on said plunger moving said plunger upward compressing said spring means and forcing fluid from said interior of said cylinder out said plunger passage through said second one-way valve, and with said spring means moving said plunger downward drawing fluid from said container into said interior of said cylinder through said upper opening and first one-way valve, and
    with said first one-way head holding valve blocking fluid flow through said upper opening at all times except when said plunger is moving downward and drawing fluid from said container through said upper opening; and
    a sliding seal between said plunger and cylinder,
    with said plunger having an upper end positioned within said cylinder above said seal and said stop means and with said second one-way valve carried at said plunger upper end.

2. A dispenser as defined in claim 1 wherein said plunger has a lower end for engagement by an operator, and the lower end of said plunger passage defines an oblique path terminating above said plunger lower end so that fluid is discharged generally downwardly without contact with said lower end.

3. A dispenser as defined in claim 1 wherein said container has an opening adjacent its upper end, and including a check valve carried on said container for permitting flow through said opening only into said container.

4. In a push up fluid dispenser having a fluid storage container and a vertically oriented plunger carried in said container, with said plunger being manually pushable upward for dispensing fluid from said container, the improvement comprising in combination;
    a valve cylinder including means for mounting said cylinder in said container, said cylinder having an upper opening and an interior passage for slidingly receiving said plunger,
    said means for mounting including interengaging means for joining said cylinder to said container for support of said cylinder on said container and movement of said cylinder with said container, and seal means for fluid sealing between said cylinder and container,
    with said plunger having a fluid flow passage therein providing a flow path from the interior of said cylinder to the exterior of said dispenser;
    first and second one-way valves, with said first one-way valve being a head holding valve and disposed for control of fluid flow into said interior of said cylinder through said upper opening and with said second one-way valve disposed for control of fluid flow from said interior into said plunger passage;
    spring means engaging said cylinder and plunger urging said plunger downward away from said cylinder upper openings; and
    said cylinder and plunger having interengaging stop means for limiting downward movement of said plunger.
    with an upward force on said plunger moving said plunger upward compressing said spring means and forcing fluid from said interior of said cylinder out said plunger passage through said second one-way valve, and with said spring means moving said plunger downward drawing fluid from said container into said interior of said cylinder through said upper opening and first one-way valve, and
    with said first one-way head holding valve blocking fluid flow through said upper opening at all times except when said plunger is moving downward and drawing fluid from said container through said upper opening;
    with said first one-way valve comprising a disc assembly of a relatively rigid washer with a central opening, and a relatively flexible resilient seal having an annular rim enclosing said washer and a central flapper joined to said rim and overlying said washer central opening, and
    with said spring means comprising a single spring positioned in said cylinder and engaging said disc assembly and holding said first one-way valve in place in said cylinder.

5. A dispenser as defined in claim 4 wherein said first one-way valve is a self-contained head holding valve with said washer having a projecting annular shoulder at said central opening, with said flapper engaging said shoulder.

6. A dispenser as defined in claim 4 wherein said second one-way valve comprises a flexible duck bill valve positioned within said plunger passage.

7. In a push up fluid dispenser having a fluid storage container and a vertically oriented plunger carried in said container, with said plunger being manually pushable upward for dispensing fluid from said container, the improvement comprising in combination;
a valve cylinder including means for mounting said cylinder in said container, said cylinder having an upper opening and an interior passage for slidingly receiving said plunger,
with said plunger having a fluid flow passage therein providing a flow path from the interior of said cylinder to the exterior of said dispenser;
first and second one-way valves, with said first one-way valve disposed for control of fluid flow into said interior of said cylinder through said upper opening and with said second one-way valve disposed for control of fluid flow from said interior into said plunger passage;
spring means engaging said cylinder and plunger urging said plunger downward away from said cylinder upper opening, said spring means comprising a coil spring positioned between said first and second one-way valves, urging said first one-way valve into engagement with said cylinder and said second one-way valve into engagement with said plunger; and
said cylinder and plunger having interengaging stop means for limiting downward movement of said plunger,
with an upward force on said plunger moving said plunger upward comprising said spring means and forcing fluid from said interior of said cylinder out said plunger passage through said second one-way valve, and with said spring means moving said plunger downward drawing fluid from said container into said interior of said cylinder through said upper opening and first one-way valve.

8. A dispenser as defined in claim 7 wherein said plunger has a lower end for engagement by an operator, and the lower end of said plunger passage is oblique and terminates above said plunger lower end.

9. A dispenser as defined in claim 7 wherein said plunger has a lower end for engagement by an operator, and the lower end of said plunger passage is oblique and terminates above said plunger lower end.

10. A dispenser as defined in claim 7 wherein said first one-way valve comprises a disc assembly of a relatively rigid washer with a central opening, and a relatively flexible resilient seal having an annular rim enclosing said washer and a central flapper joined to said rim and overlying said washer central opening.

11. A dispenser as defined in claim 10 wherein said first one-way valve is a self contained head holding valve with said washer having a projecting annular shoulder at said central opening, with said flapper engaging said shoulder.

12. In a push up fluid dispenser having a fluid storage container and a vertically oriented plunger carried in said container, with said plunger being manually pushable upward for dispensing fluid from said container, the improvement comprising in combination:
a valve cylinder including means for mounting said cylinder in said container, said cylinder having an upper opening and an interior passage for slidingly receiving said plunger,
with said plunger having a fluid flow passage therein providing a flow path from the interior of said cylinder to the exterior of said dispenser and having a lower end for engagement by an operator, with the lower end of said plunger passage oblique and terminating above said plunger lower end;
first and second one-way valves, with said first one-way valve disposed for control of fluid flow into said interior of said cylinder through said upper opening and with said second one-way valve disposed for control of fluid flow from said interior into said plunger passage, said first one-way valve comprising a disc assembly of a relatively rigid washer with a central opening, and relatively flexible resilient seal having an annular rim enclosing said washer and a central flapper joined to said rim and overlying said washer central opening;
a coil spring positioned between said first and second one-way valves, urging said first one-way valve into engagement with said cylinder and said second one-way valve into engagement with said plunger and urging said plunger downward away from said cylinder upper opening; and
a stop pin in said cylinder riding in a groove in said plunger for limiting downward movement of said plunger,
with an upward force on said plunger moving said plunger upward compressing said spring means and forcing fluid from said interior of said cylinder out said plunger passage through said second one-way valve, and with said spring means moving said plunger downward drawing fluid from said container into said interior of said cylinder through said upper opening and first one-way valve.

* * * * *